United States Patent
White

(10) Patent No.: US 10,325,579 B1
(45) Date of Patent: Jun. 18, 2019

(54) MEANS AND METHOD FOR INFORMING A STRINGED INSTRUMENT PLAYER OF THE MECHANICAL STATUS OF THEIR INSTRUMENT'S STRINGS AND WHEN AND WHETHER THE STRINGS NEED TO BE REPLACED

(71) Applicant: Timothy P. White, New Boston, NH (US)

(72) Inventor: Timothy P. White, New Boston, NH (US)

( * ) Notice: Subject to any disclaimer, the term of this patent is extended or adjusted under 35 U.S.C. 154(b) by 0 days.

(21) Appl. No.: 16/114,254

(22) Filed: Aug. 28, 2018

Related U.S. Application Data

(60) Provisional application No. 62/551,247, filed on Aug. 29, 2017.

(51) Int. Cl.
  *G10G 7/02* (2006.01)
  *G01H 1/14* (2006.01)
  *G10D 3/14* (2006.01)

(52) U.S. Cl.
  CPC ............ *G10G 7/02* (2013.01); *G01H 1/14* (2013.01); *G10D 3/14* (2013.01)

(58) Field of Classification Search
  CPC .................................. G10G 7/02; G01H 1/14
  See application file for complete search history.

(56) References Cited

U.S. PATENT DOCUMENTS

| | | | | |
|---|---|---|---|---|
| 7,371,954 B2 * | 5/2008 | Masuda | .................. | G10G 7/02 84/454 |
| 8,759,655 B2 * | 6/2014 | Ribner | .................... | G10G 7/02 84/454 |
| 9,548,044 B2 * | 1/2017 | Chekardzhikov | ........ | G10G 7/02 |
| 2018/0277083 A1 * | 9/2018 | Ruchert | .................. | G10G 7/02 |

* cited by examiner

*Primary Examiner* — Robert W Horn
(74) *Attorney, Agent, or Firm* — Luis Figarella

(57) ABSTRACT

A system and method to help players of string instruments with the usability of their instruments, particularly with the detection and assessment of the mechanical status of their instrument's strings and in determining when and/or whether the strings need to be replaced.

6 Claims, 20 Drawing Sheets

Configuration:
External vibration sensor
(piezo-electric or microphone)

Schematic showing a vibrating string on a guitar, an external string vibration sensor, and an external device with means to determine the properties of the string's vibration indicative of the need to replace the string.

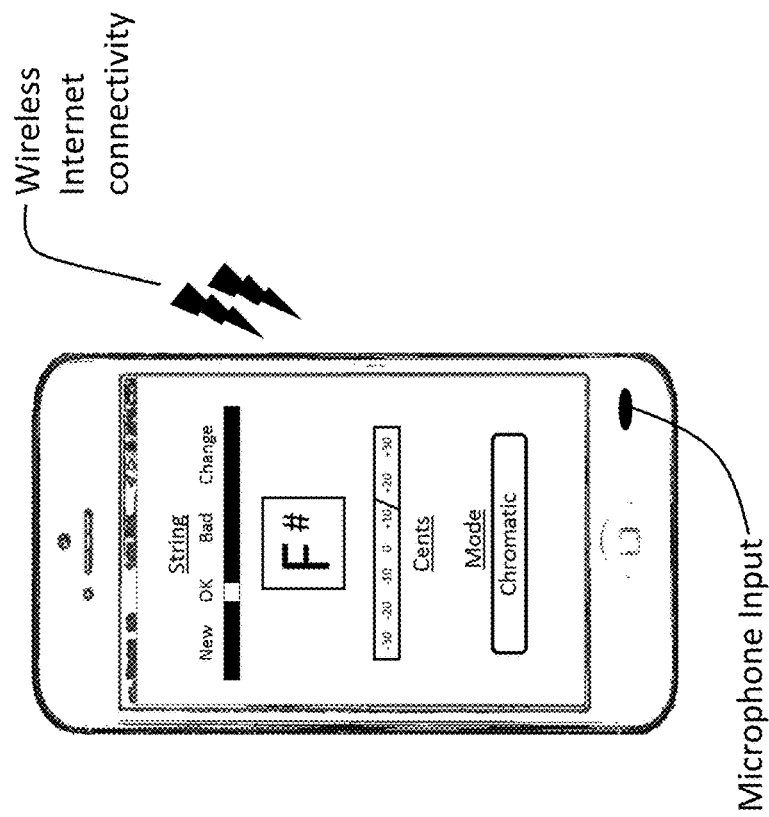
Figure 3b  Software Product
Phone/Pad Software Application with Both Tuner and String-Changer Functions
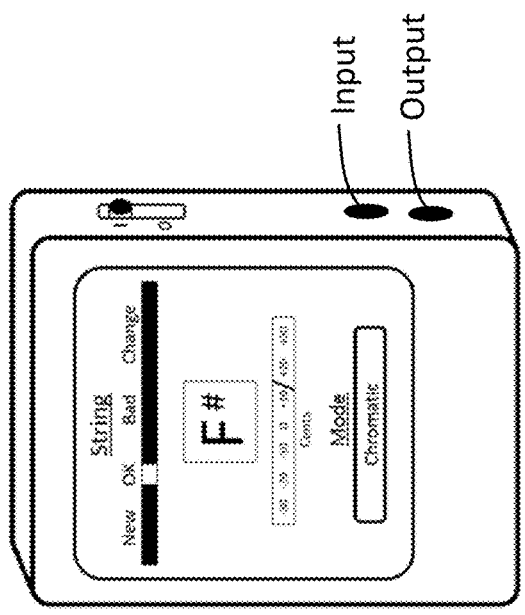
Figure 3a  Hardware Product
Stand-Alone Device Providing Both Tuner and String-Changer Functions
Mechanical design of dedicated device is compatible with any guitar tuner device on the market.

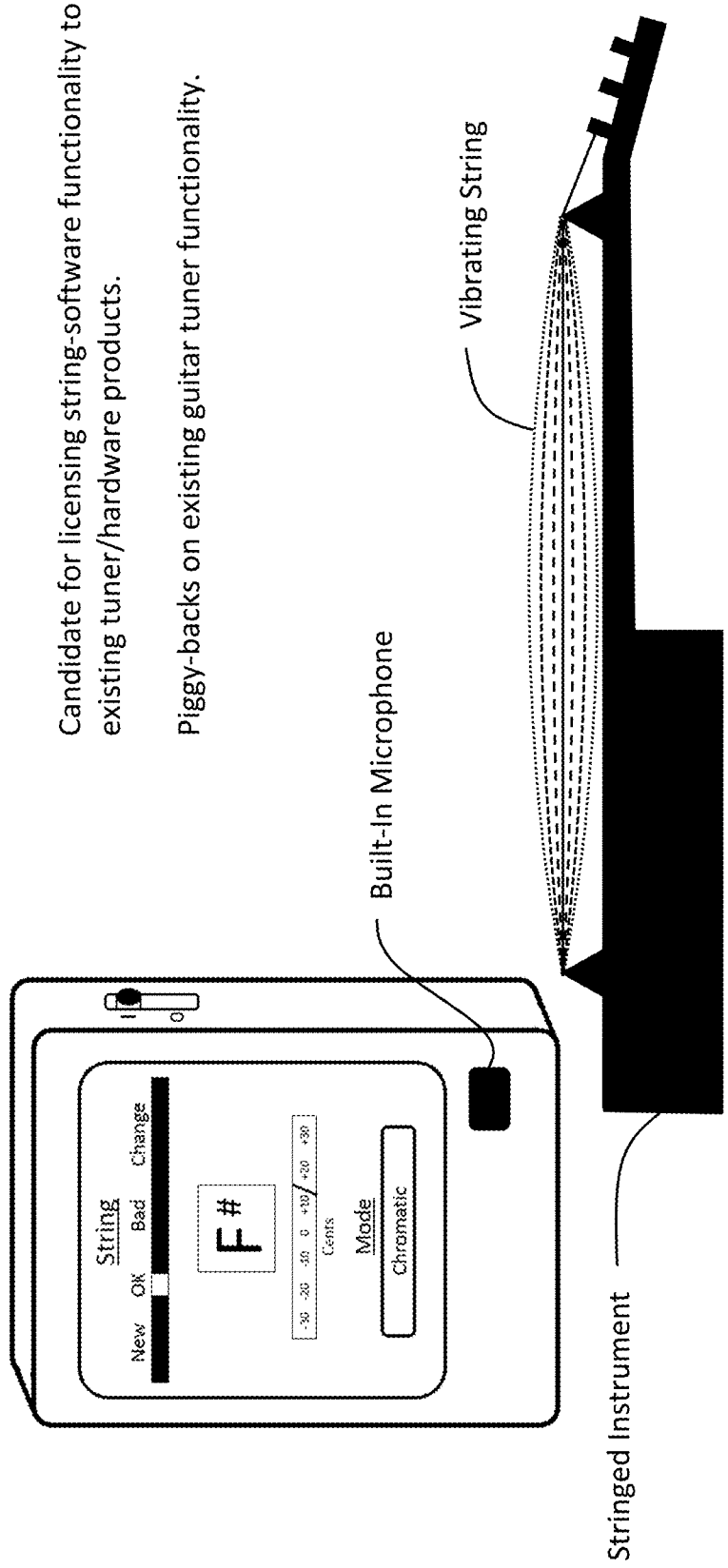
Figure 4  Stringed instrument with String-Changer stand-alone hardware product providing both string-tuner and String-Changer functions.
Candidate for licensing string-software functionality to existing tuner/hardware products.
Piggy-backs on existing guitar tuner functionality.

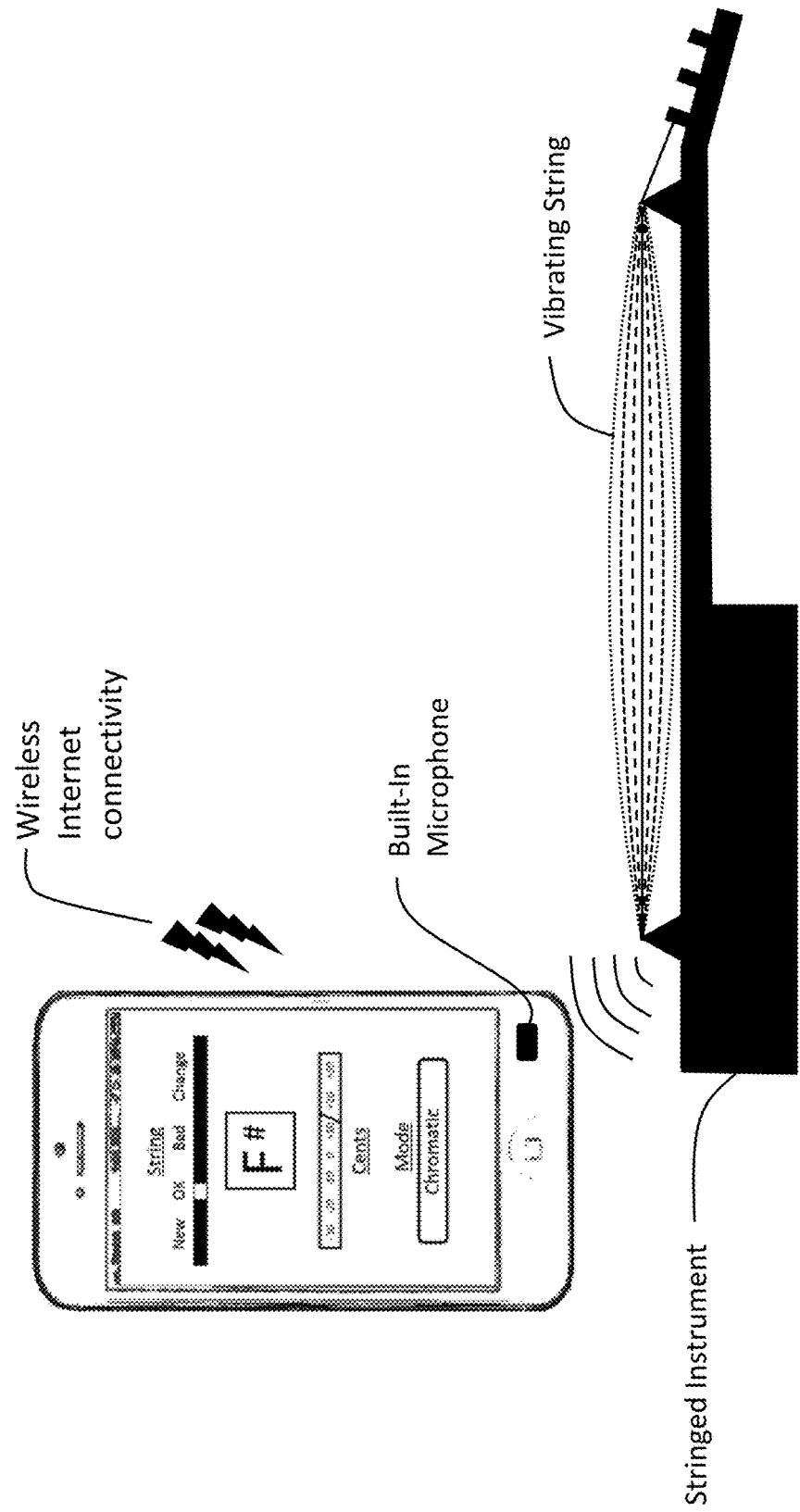
Figure 5  Stringed instrument with String-Changer software product running on phone or other device. Candidate for licensing string-software functionality to existing tuner/hardware products.

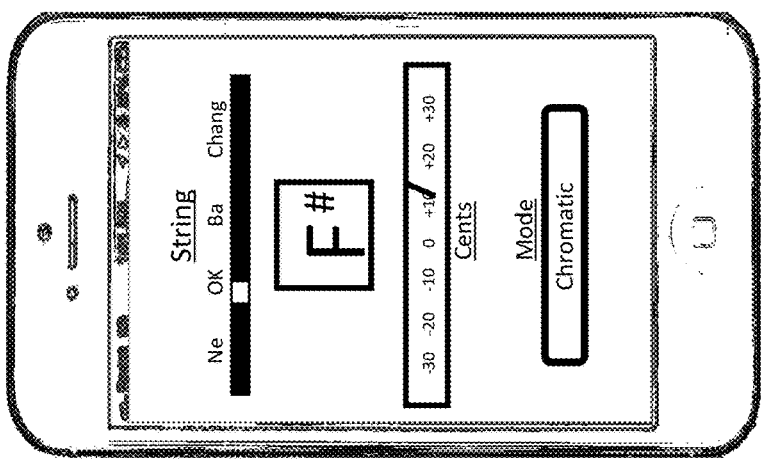
Figure 7b  Phone running software applications for tuning guitar strings and displaying their state.
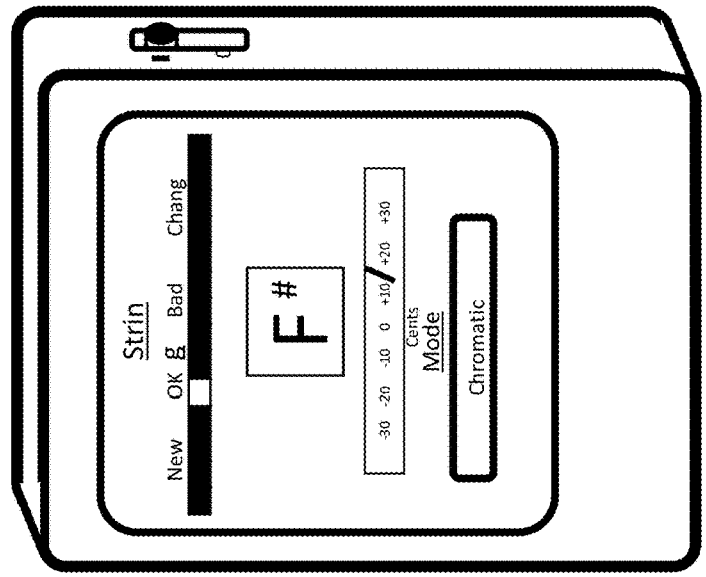
Figure 7a  Stand-alone device for tuning guitar strings and displaying their state.

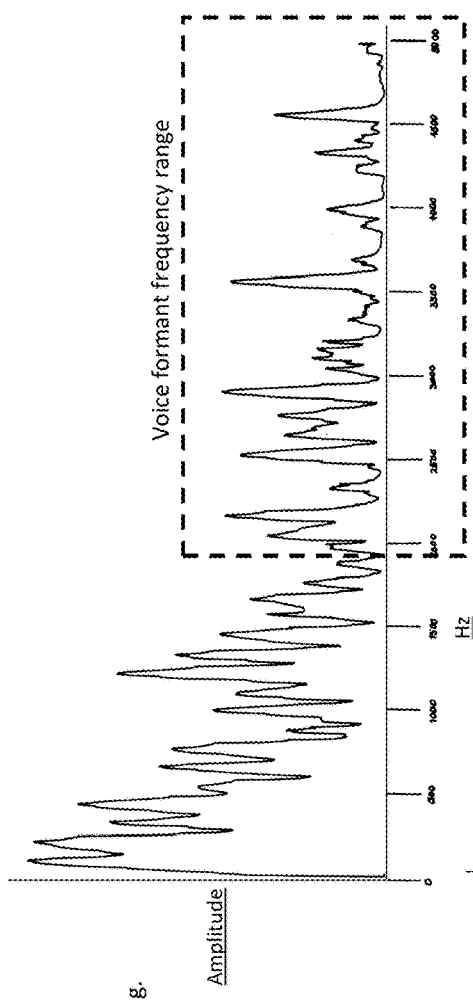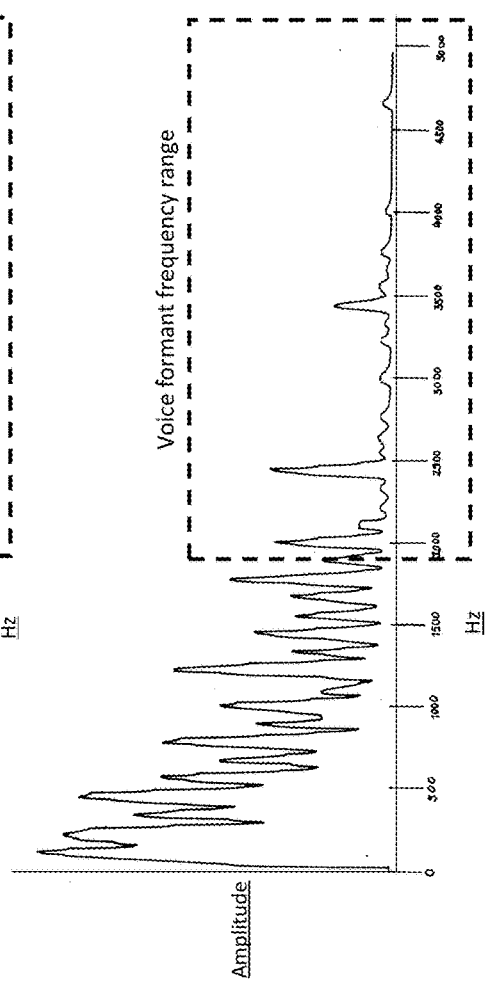
Figure 8a — Impulse Spectrogram – Normal Guitar String. A-110Hz plucked at fifth fret on the low E-83 string.
Figure 8b — Impulse Spectrogram – Dead Guitar String. A-110Hz plucked on open A-110 string.

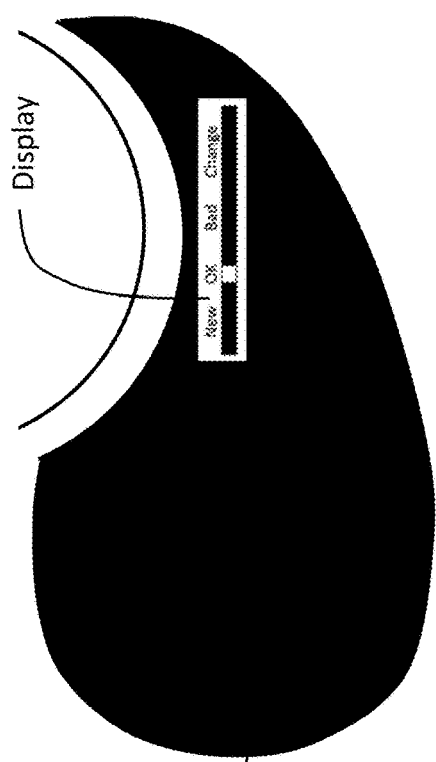
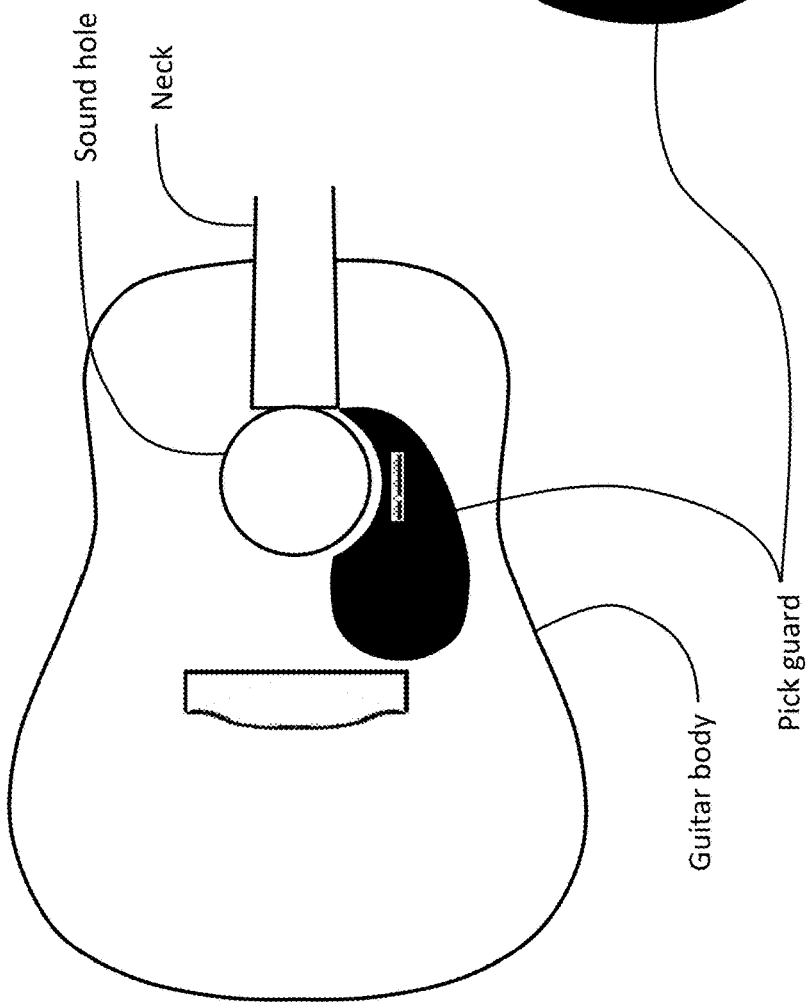
Figure 9a   String status display on or in the guitar body, here by example shown in the pickguard.
Figure 9b   Close-up of string status display

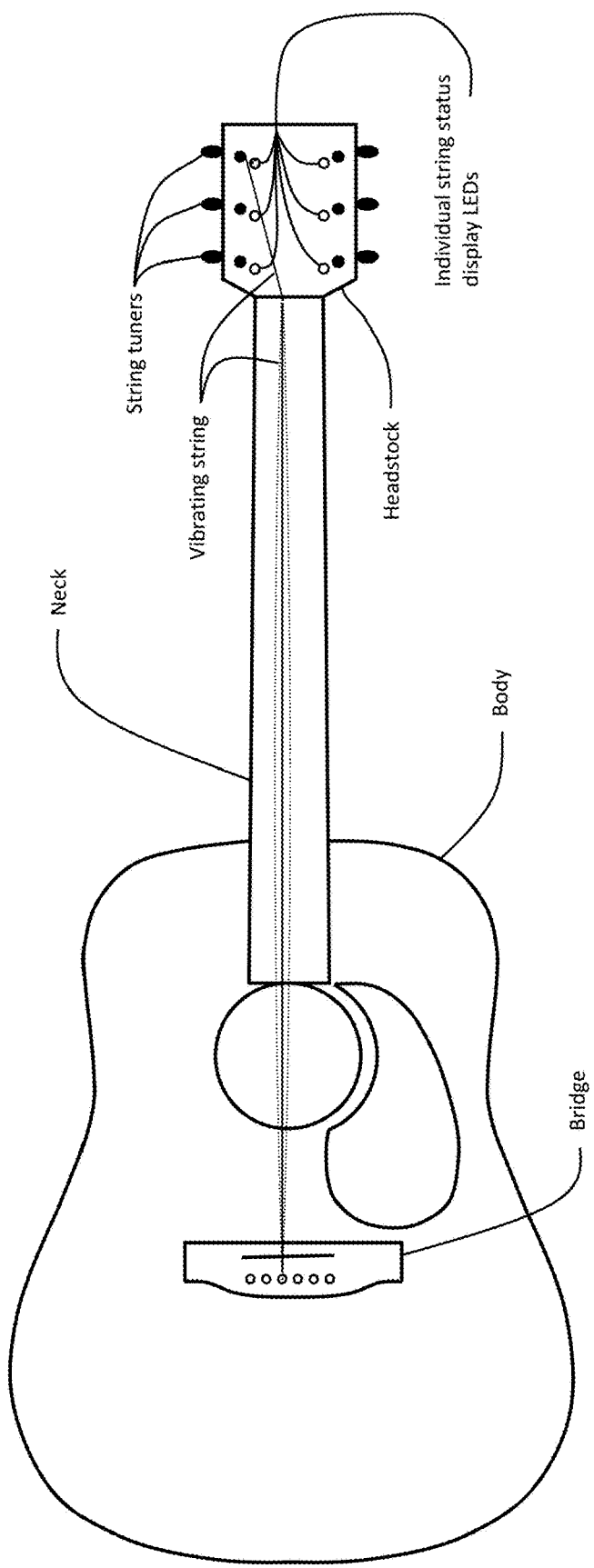
Figure 10    String status display shown in headstock as individual color-coded status display LEDs.

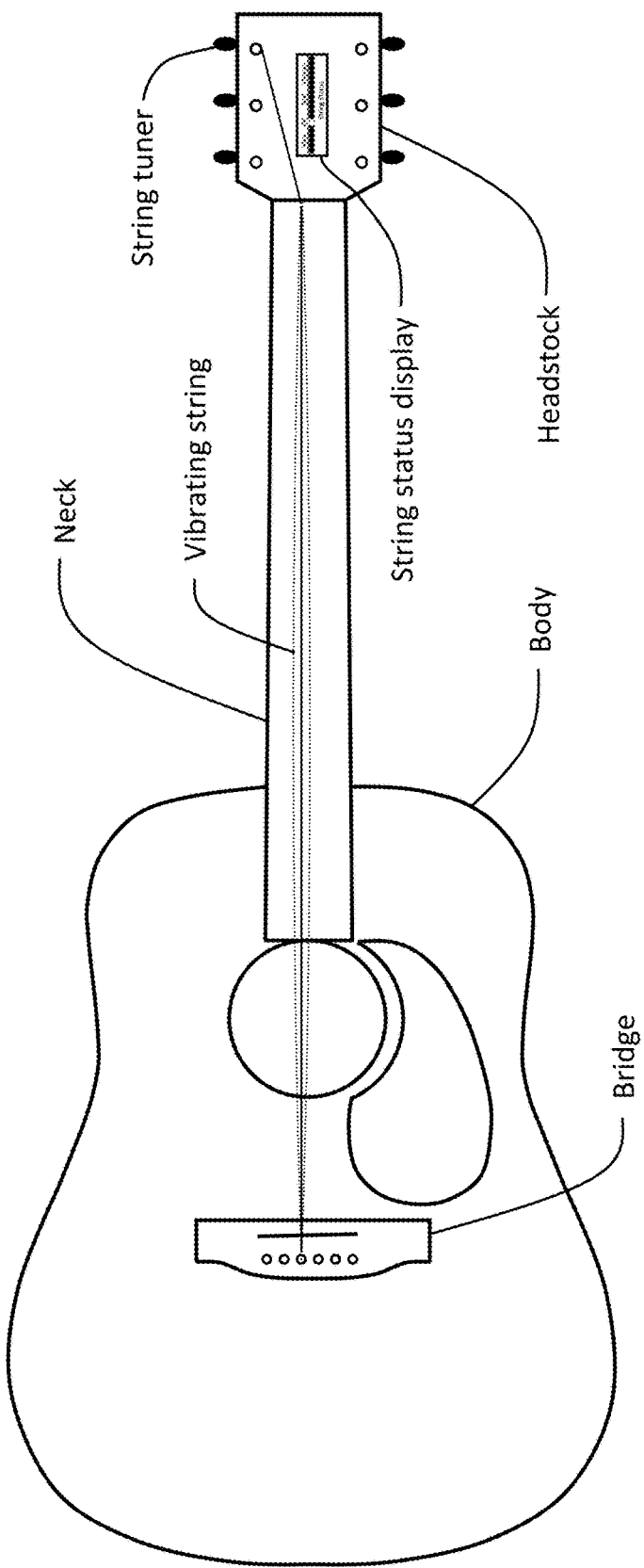
Figure 11  String status display on or in a guitar's headstock.

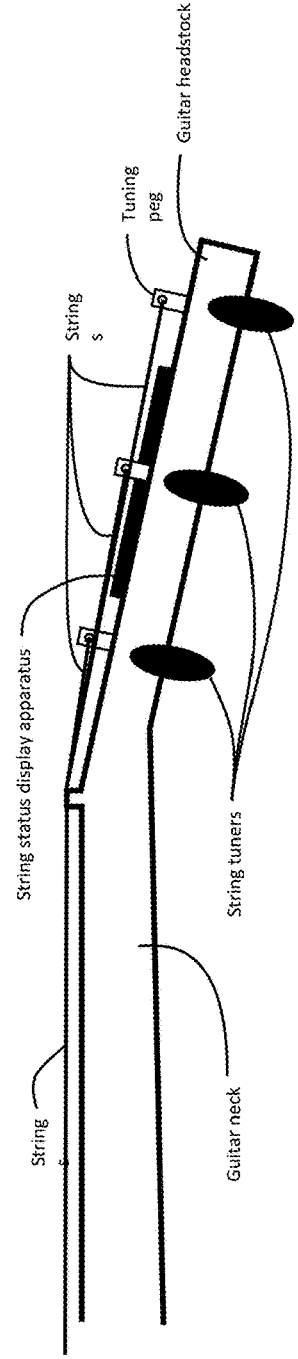
Figure 12a   Side view of a guitar headstock with a separable magnetically-attached string status display apparatus.
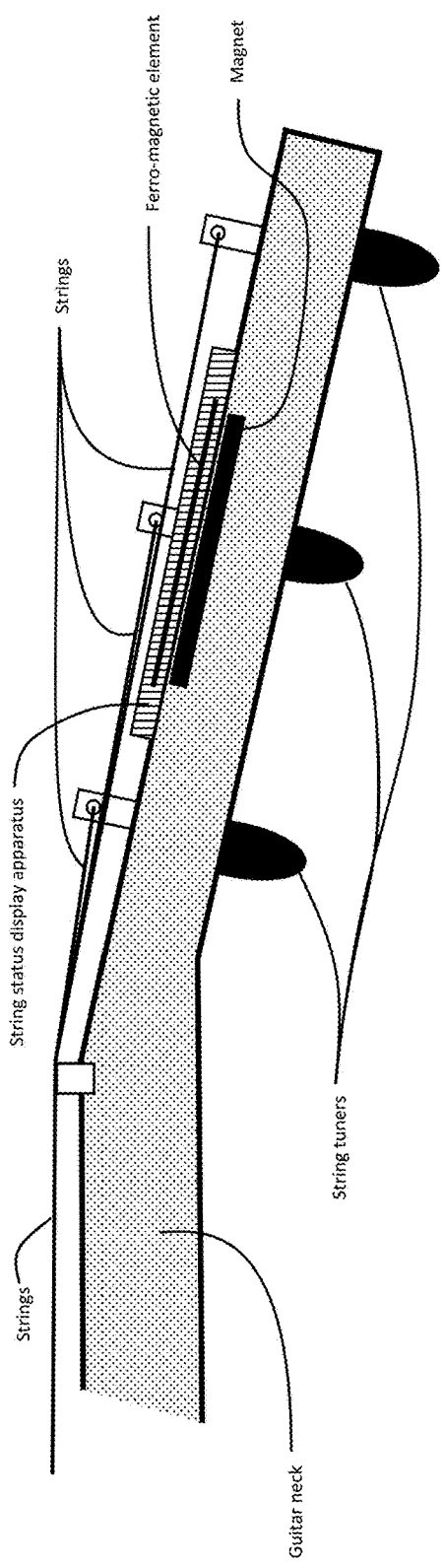
Figure 12 b   Sagittal cross-section view of a guitar headstock with a separable magnetically-attached string status display apparatus.

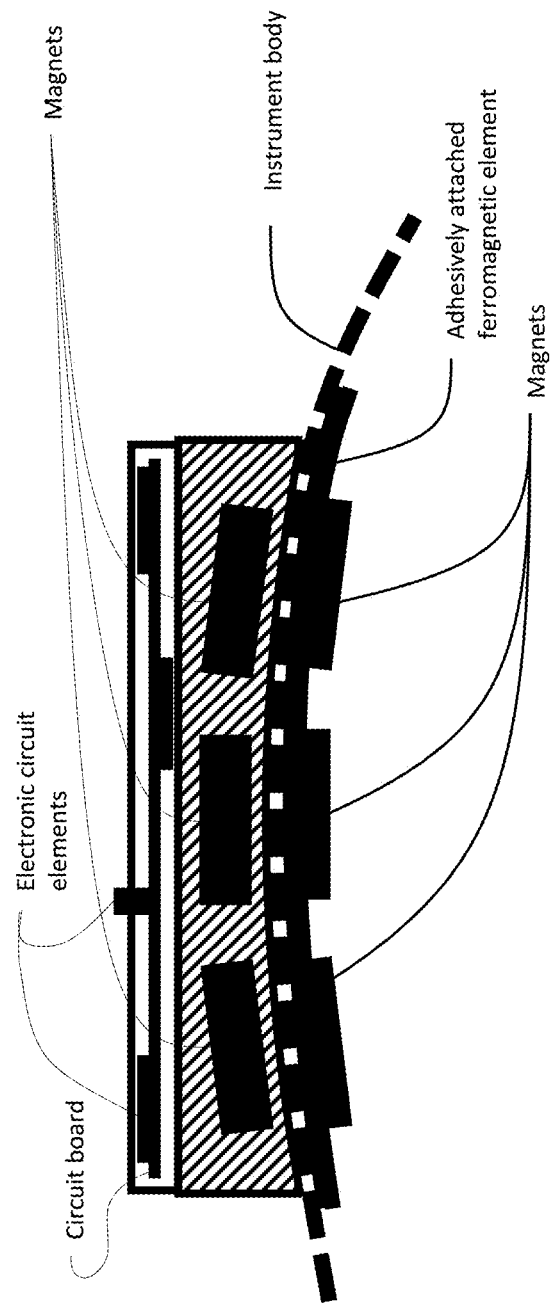
Figure 13  Cross-section of magnetically-mounted electronic device such as a string tuner or string-change indicator, where internal magnetic attachment elements are permanently attached with adhesive.

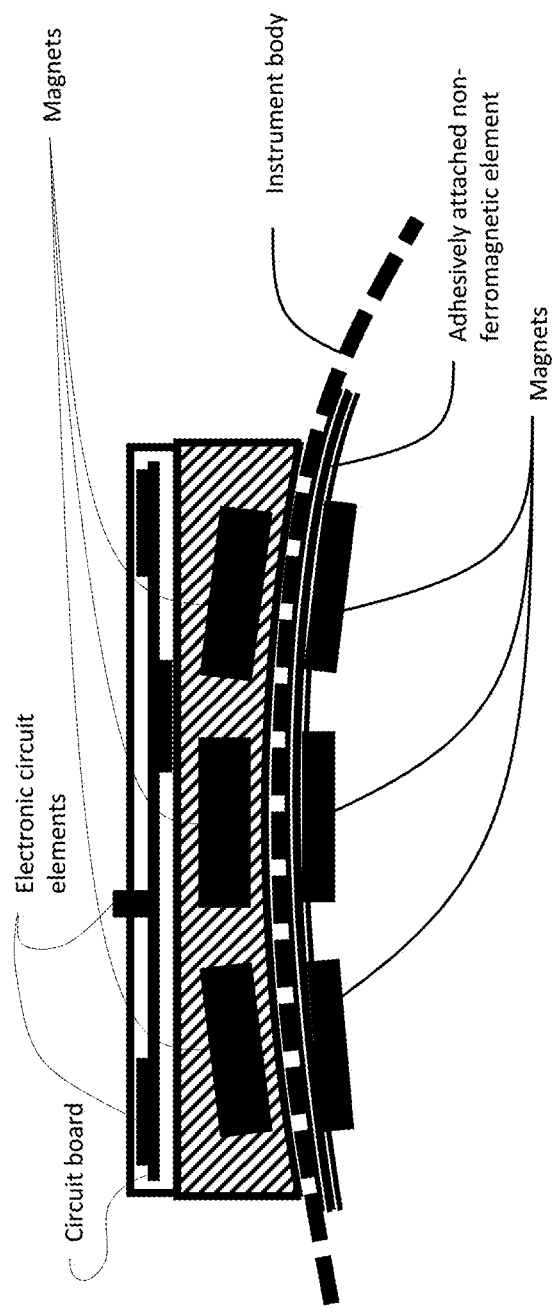
Figure 14  Cross-section of magnetically-mounted electronic device such as a string tuner or string-change indicator, where internal magnets are mounted on an adhesively-attached non-ferromagnetic element.

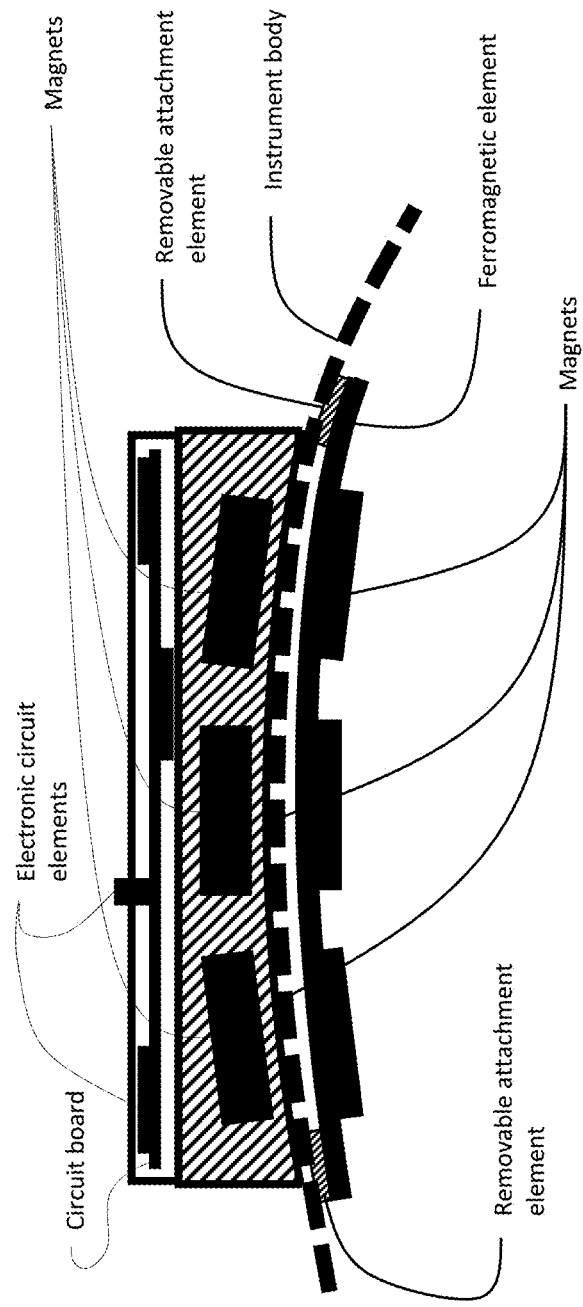
Figure 15  Cross-section of magnetically-mounted electronic device such as a string tuner or string-change indicator, where internal ferromagnetic element and magnets are removably attached to the inner surface of the instrument body.

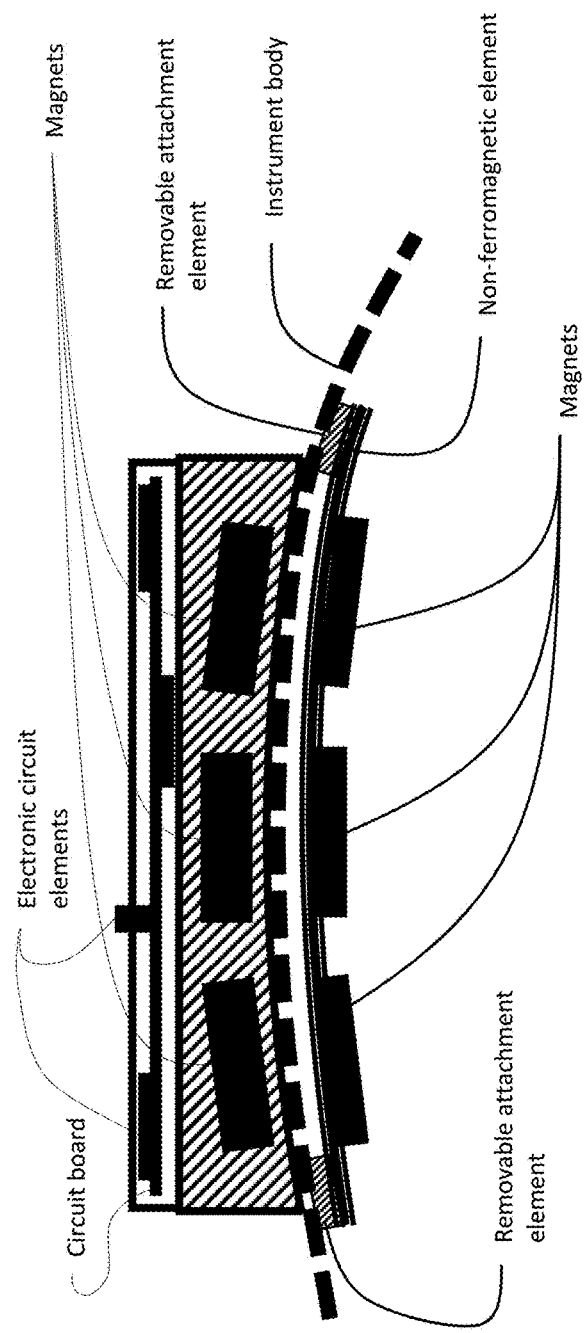
Figure 16 Cross-section of magnetically-mounted electronic device such as a string tuner or string-change indicator, where internal ferromagnetic element and magnets are removably attached to the inner surface of the instrument body.

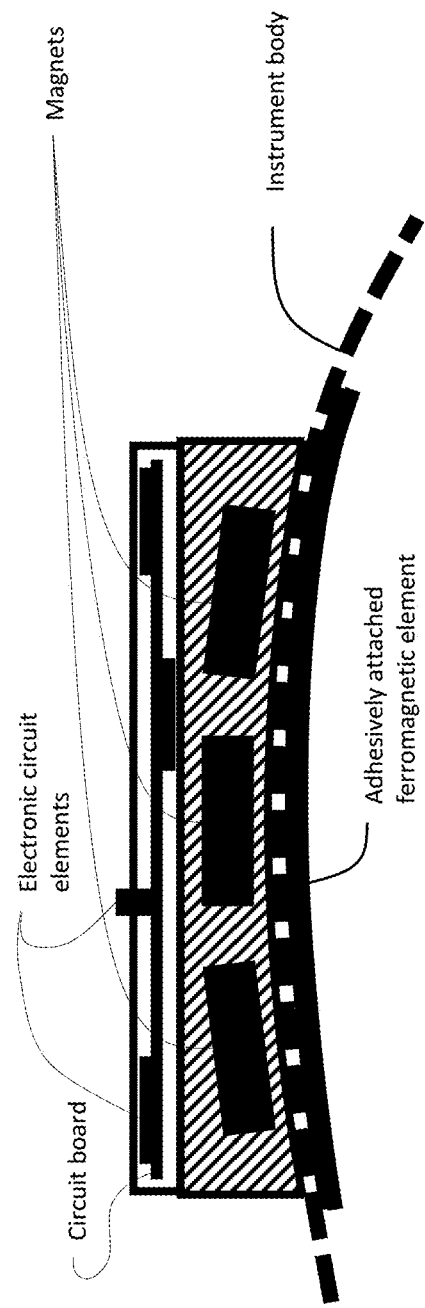
Figure 17  Cross-section of magnetically-mounted electronic device with permanently-mounted internal ferromagnetic element Cross-section of phone case or device case with single and multiple insert-molded magnets or ferromagnetic elements.

Cross-section of phone case with single and multiple insert-molded magnets or ferromagnetic elements.

Cross-section of phone case composed of ferro-magnetic material

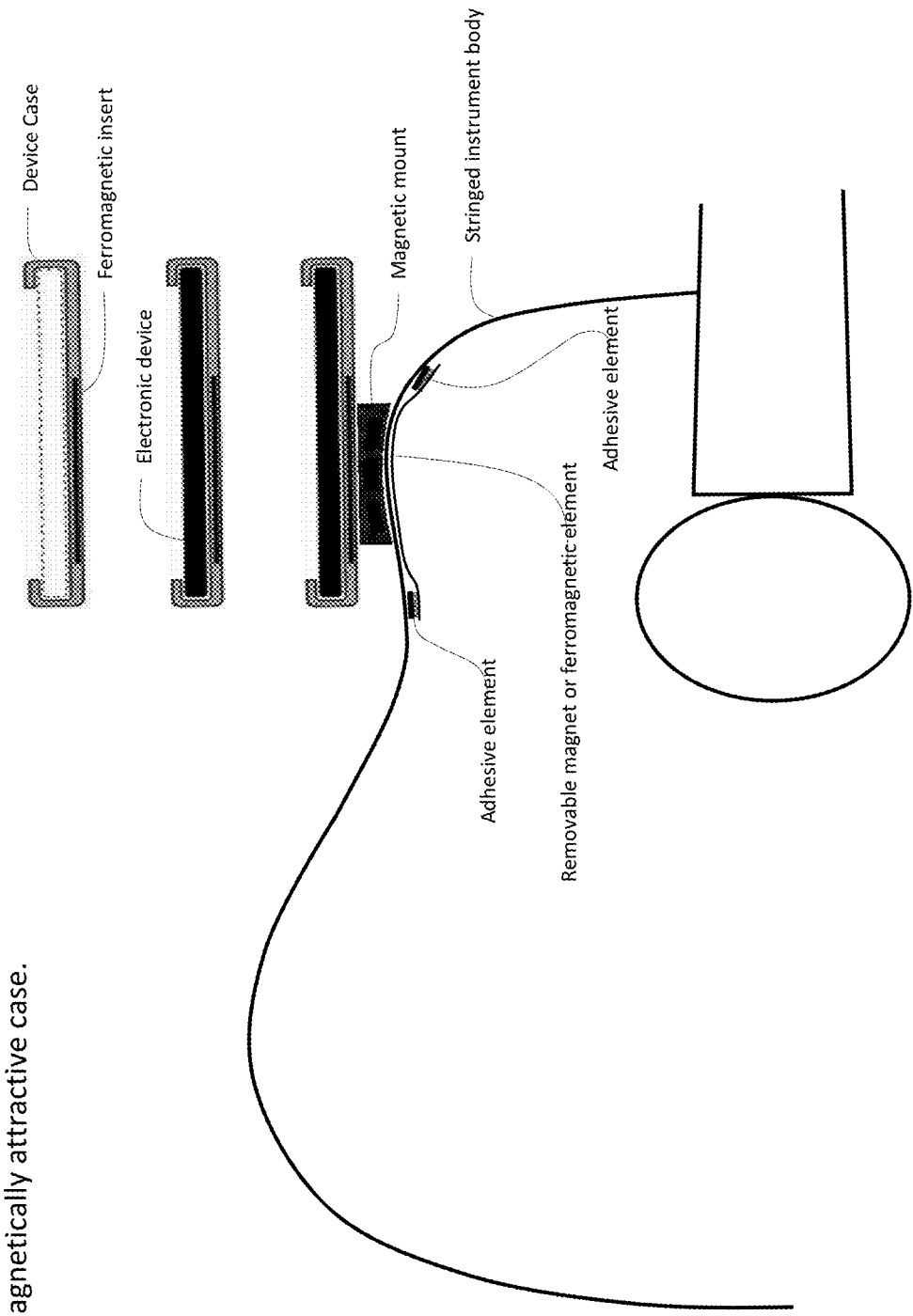
Figure 19 Exploded assembly view of a guitar with an attached electronic device held in a ferromagnetically attractive case.

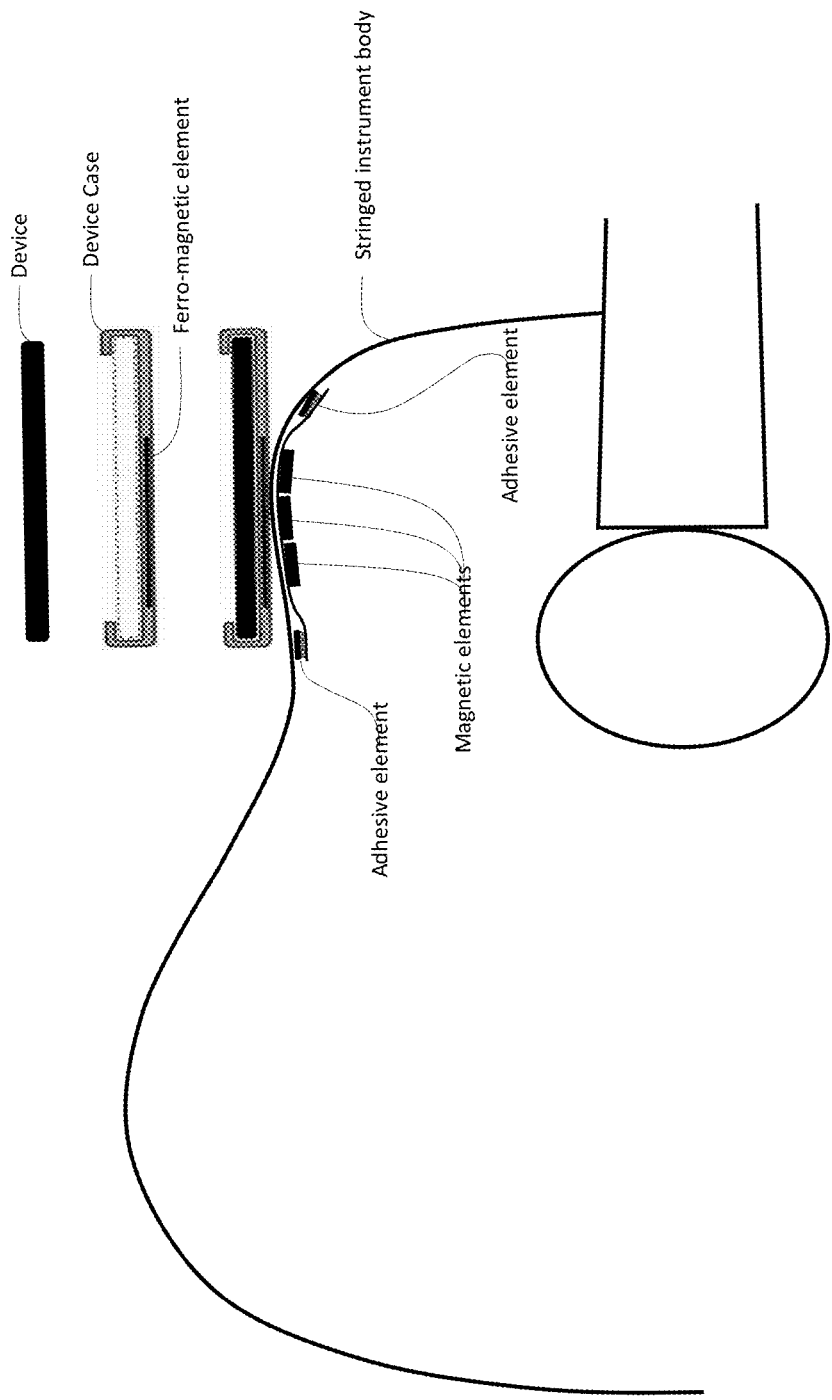
Figure 20   Exploded assembly view of a guitar with an attached electronic device held in a ferro-magnetically attractive case.

MEANS AND METHOD FOR INFORMING A STRINGED INSTRUMENT PLAYER OF THE MECHANICAL STATUS OF THEIR INSTRUMENT'S STRINGS AND WHEN AND WHETHER THE STRINGS NEED TO BE REPLACED

CROSS-REFERENCE TO RELATED APPLICATIONS

This application claims priority to U.S. Provisional patent application Ser. No. 62/551,247 titled "A Means and Method for Informing a Stringed Instrument Player of the Mechanical Status of Their Instrument's Strings and When and Whether the Strings Need to be Replaced", filed on Aug. 29, 2018 the disclosure of which is herein incorporated by reference in its entirety.

DOCUMENTS CITED

The following documents and references are incorporated by reference in their entirety, "On the Aging of Steel Guitar Strings", John Allen, Bell Labs, Murray Hill N.J.; "Investigation of Play-wear damage on Steel music strings . . . ", Bulbul et al, Savart Journal, July 2015; "Microscopic Examination of Play-worn steel music strings", Bulbul, Friction and Wear Research, Volume 3, 2015.

FIELD OF THE INVENTION

The present invention relates to a system and method to help players of string instruments, and particularly to the detection of the mechanical status of their instrument's strings and when and/or whether the strings need to be replaced.

DESCRIPTION OF THE RELATED ART

Experienced players of guitars and other stringed musical instruments have long known that their instrument's strings possess their best tonal quality when the strings are new. Since the advent of stringed musical instruments more than 5000 years ago, it has up to the subjective judgment of the musician as to when the tonality of their strings has degraded sufficiently to warrant putting new strings on their instrument. Many beginning musicians never change their strings except to replace individual strings that have broken. Many professional musicians put new strings on their instrument before every performance. No quantitative tool has been available to musicians to judge the mechanical state of their strings as they gradually degrade in tone quality and playability.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process In one aspect the invention is about a stringed musical instrument string mechanical and tonal degradation measurement apparatus comprising one or more sensors for detecting the vibrational behavior of one or more strings when played, a hardware and/or software signal-processing means to analyze the sensors' string vibration signal to detect and measure in such signal features indicative of mechanical string degradation, a hardware and/or software means to measure the degree of such degradation and a visual and/or an audible indication to the musician of the degree of such degradation. In another aspect, said apparatus consists of an external electronic device such as a smart phone running appropriate software to present the functionality of the general apparatus described. In another aspect, said apparatus consists of an external electronic device such as a guitar tuner modified to also present the functionality of the general apparatus. In another aspect, said apparatus consists of an external electronic device such as a guitar amplifier or tone control means incorporates the functionality of the general apparatus. In another aspect, said apparatus consists of a stand-alone electronic device presenting only the functionality of the general apparatus.

In one aspect, the invention is about a method of employing one or more sensors to detect the vibrational behavior of one or more stringed musical instrument strings, employing a hardware and/or software signal-processing means to analyze the sensors' string vibration signal to detect and measure signal features associated with string mechanical degradation, employing a hardware and/or software means to measure the degree of such string degradation, and providing a visual and/or an audible indication to a musician of the degree of such string degradation. In another aspect, said method manually or automatically sending a message to a musical instrument string manufacturer, distributor or sales entity information relevant to the mechanical status of a musician's stringed instrument strings. In yet another aspect the information sent to a musical instrument string manufacturer, distributor or sales entity information relevant to the mechanical status of a musician's stringed instrument strings results in the sale and/or shipment to a musician of one or more new replacement strings. In another aspect, a musician is sold an ongoing string replacement subscription service whereby a musician is automatically sent new replacement strings in response to the information included in one or more messages from a musician or a stringed instrument relating to the measured degree of mechanical degradation of one or more of an instrument's string's.

Other features and advantages of the present invention will become apparent upon examining the following detailed description of an embodiment thereof, taken in conjunction with the attached drawings.

BRIEF DESCRIPTION OF THE DRAWINGS

FIG. 3a shows a front view of a device where the where the string-changer function is integrated into a typical stand-along guitar string tuner, according to an exemplary embodiment of the invention.

FIG. 3b shows a front view of a device where the string changer function exists as a software program running on a general-purpose electronic device such as a smart phone with wireless connectivity to other devices or the Internet, according to an exemplary embodiment of the invention.

FIG. 4 shows a side view of the invention where the string-changer function is integrated into a typical stand-along guitar string tuner, according to an exemplary embodiment of the invention.

FIG. 5 shows a front view of the invention where the string changer function exists as a software program running on a general-purpose electronic device such as a smart phone with wireless connectivity to other devices or the Internet, according to an exemplary embodiment of the invention.

FIG. 7a shows a front view of an acoustic impulse spectrogram of the tone made by a new guitar string plucked on a guitar at frequency of A-110 Hz, according to an exemplary embodiment of the invention.

FIG. 7b shows a front view of an acoustic impulse spectrogram of the tone made by a used guitar string plucked on the same guitar at a frequency of A-110 Hz, according to an exemplary embodiment of the invention.

FIGS. 8A-8B show Impulse spectrograph charts where the string changer apparatus is incorporated into the pick guard of a guitar, according to an exemplary embodiment of the invention.

FIG. 9a shows a front view of the invention where the string changer apparatus is incorporated into the headstock of a guitar with colored indicator LEDs showing the status of each string, according to an exemplary embodiment of the invention.

FIG. 9b shows a magnified front view of the invention where the string changer apparatus is incorporated into the headstock of a guitar with colored indicator LEDs showing the status of each string, according to an exemplary embodiment of the invention.

FIG. 10 shows a front view of the invention where the string changer apparatus is incorporated into the headstock of a guitar with an alpha-numeric display according to an exemplary embodiment of the invention.

FIG. 11 shows a top view of invention where the string changer apparatus is magnetically attached to the headstock of the guitar, according to an exemplary embodiment of the invention.

FIG. 12a shows a side view of a guitar headstock with a separable magnetically-attached string status display apparatus, according to an exemplary embodiment of the invention.

FIG. 12b shows a sagittal cross-section side view of the invention showing a magnetic element embedded in the guitar's headstock, and a ferromagnetic element encased in the removably-attached string-changer apparatus, according to an exemplary embodiment of the invention.

FIG. 13 shows a side view of the invention as a Cross-section of magnetically-mounted electronic device such as a string tuner or string-change indicator, where internal magnetic attachment elements are permanently attached with adhesive, according to an exemplary embodiment of the invention.

FIG. 14 shows a side view of the invention as a Cross-section of magnetically-mounted electronic device such as a string tuner or string-change indicator, where internal magnetic attachment elements are permanently attached with adhesive, according to an exemplary embodiment of the invention FIG. 15 shows a side view of the invention as a Cross-section of magnetically-mounted electronic device such as a string tuner or string-change indicator, where internal magnetic attachment elements are permanently attached with adhesive, according to an exemplary embodiment of the invention.

FIG. 16 shows a side view of the invention as a Cross-section of magnetically-mounted electronic device such as a string tuner or string-change indicator, where internal magnetic attachment elements are permanently attached with adhesive, according to an exemplary embodiment of the invention.

FIG. 17 shows a cross-section of magnetically-mounted electronic device with permanently-mounted internal ferromagnetic element, according to an exemplary embodiment of the invention.

FIG. 19 shows an exploded assembly view of a guitar with an attached electronic device held in a ferro-magnetically attractive case, according to an exemplary embodiment of the invention.

FIG. 20 shows an exploded assembly view of a guitar with an attached electronic device held in a ferro-magnetically attractive case, according to an exemplary embodiment of the invention.

Figure 1:
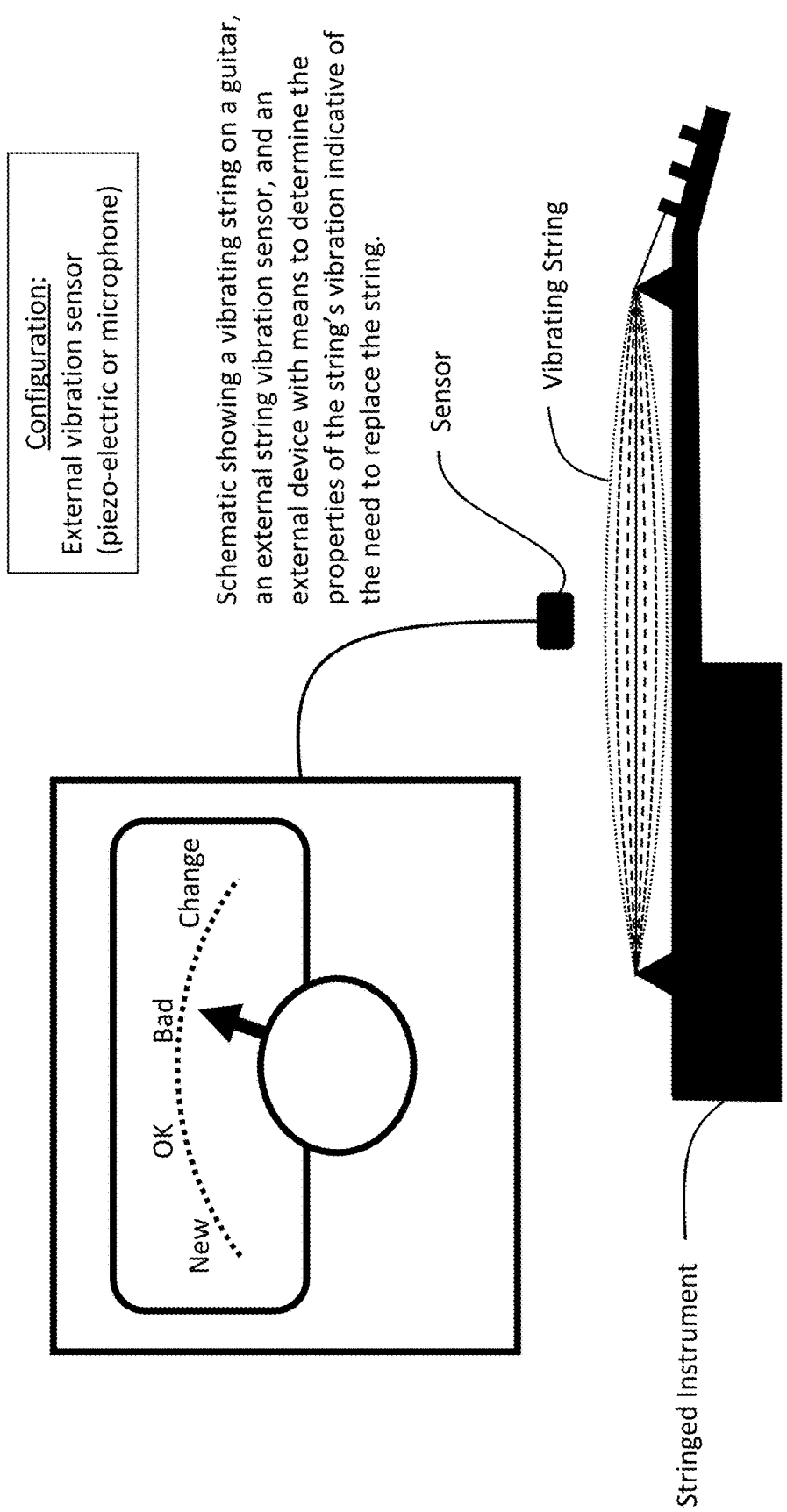
FIG. 1 shows a side view of a schematic illustration of a sensor and signal processor and display with respect to a vibrating string on a musical instrument, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 2:
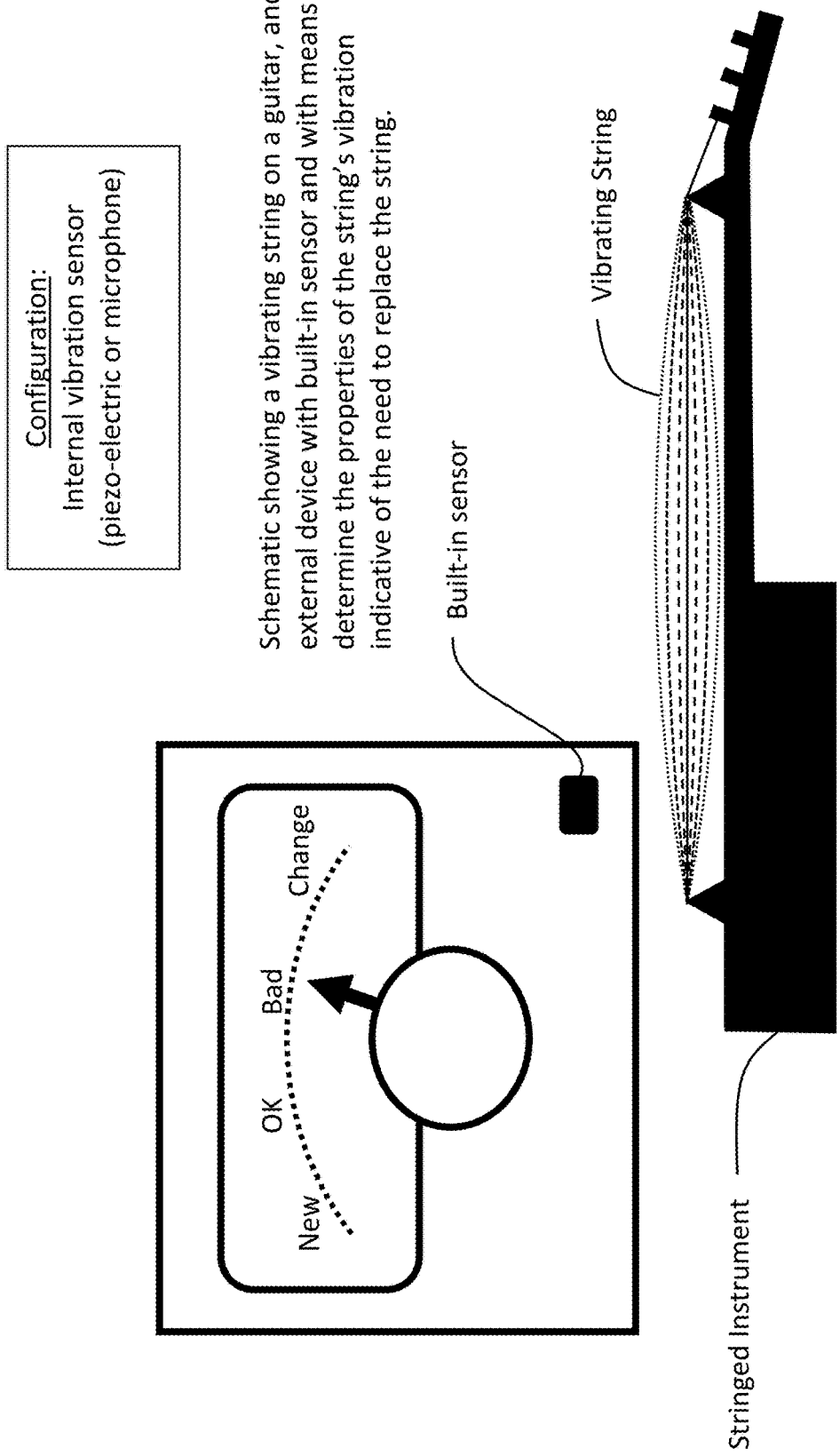
FIG. 2 shows a side view of a schematic illustration of a sensor and signal processor and display with respect to a vibrating string on a musical instrument, where the sensor is integrated into the signal processor and display device, according to an exemplary embodiment of the invention.
Figure 6:
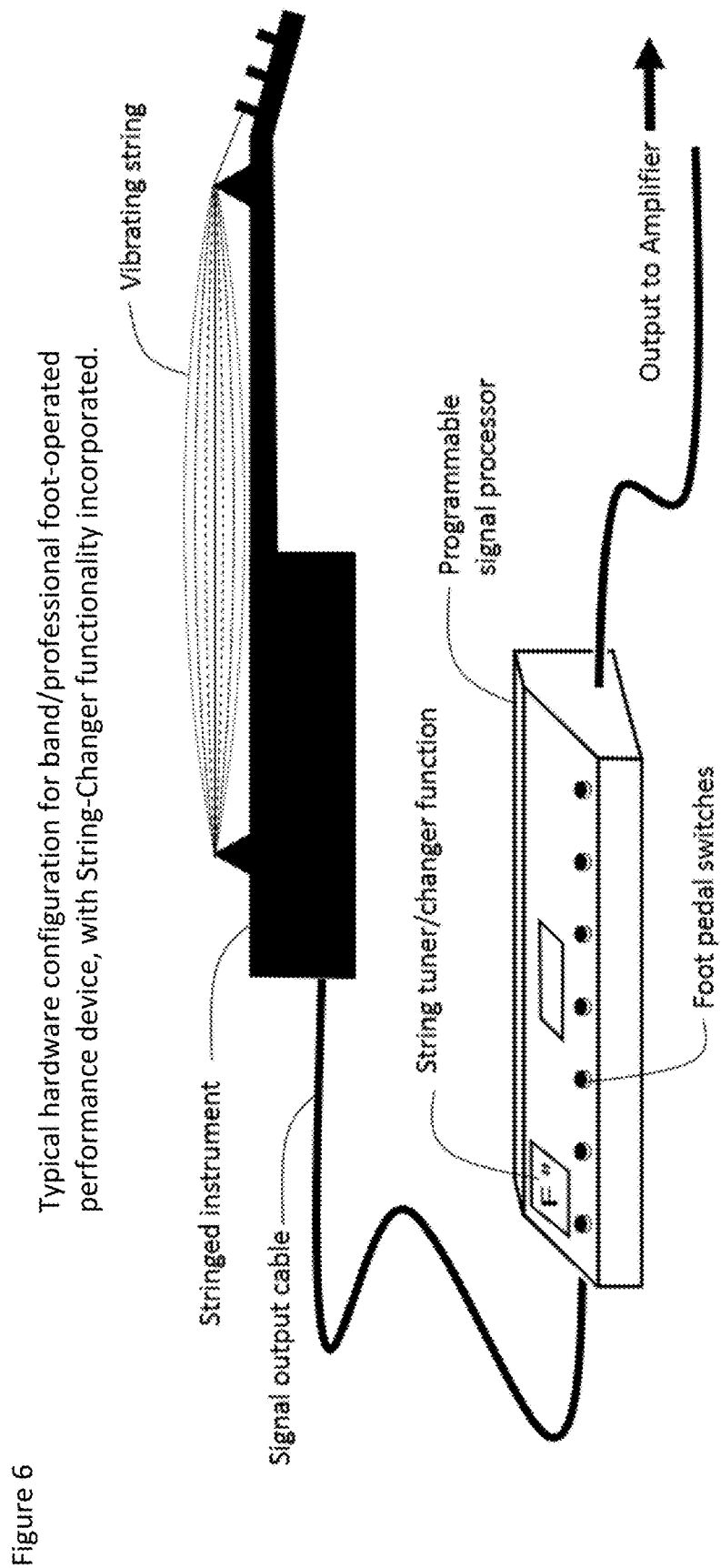
FIG. 6 shows a side view of the invention where the string changer function is incorporated into a foot-operated guitar music control device, according to an exemplary embodiment of the invention.
Figure 18A:
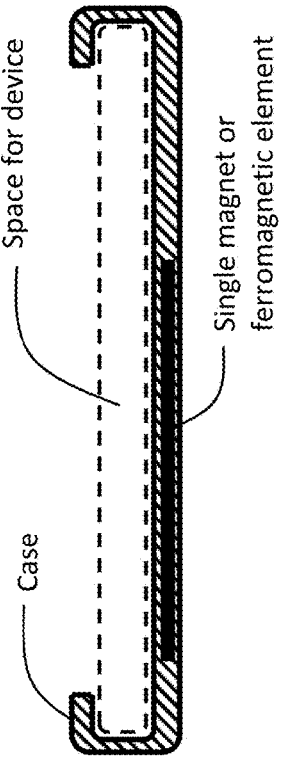
FIGS. 18a-18c illustrate cross-sections of phone cases or device cases with single and multiple insert-molded magnets or Ferro-magnetic elements, according to an exemplary embodiments of the invention.
Figure 18B:
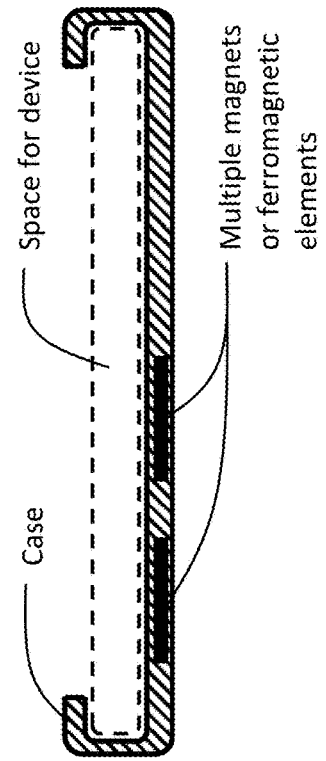
Figure 18C:
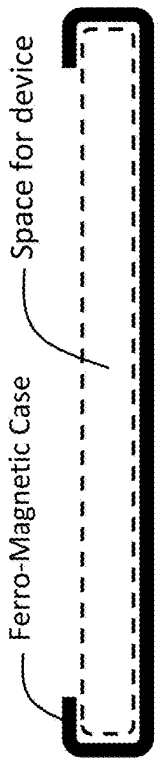

In this invention, the various physical attributes associated with typical string usage and tone quality are electronically measured, quantified and presented to the player in the form of an indication as to if and when their instrument's strings need to be changed. This indication can be presented by a separate special-purpose string-sensing device attached to or used with the guitar, as an additional feature or function of another device such as an electronic guitar tuner, or by a string age-sensing software application operating on a smart phone or other device. Referring to FIGS. 1-20, a number of different means are shown for receiving a vibrational signal from the instrument, as well as different means to display the measure of string age, and as well as different types of enclosures for the electronic circuitry which analyzes the vibrational signal.

FIG. 8a shows the acoustical spectrum of a typical new string's vibration compared to that shown in FIG. 8b for a string which is aged. One can see that the aged string signal is missing harmonic overtones in that portion of the audible spectrum where we perceive language and emotion, leading to a tone quality that may be described as "flat" or "muffled".

As a string ages from being played, the extent or range of its overtone series inevitably degrades, marked by a gradual decrease in the amplitude of the higher harmonics and a decrease in-the harmonicity of notes being played. In addition, properly tuning the strings gradually becomes more difficult and eventually becomes impossible.

These negative effects are brought on by the string's being asymmetrically corroded by the sweat and mechanical effects of the player's hands during playing, which together induce mechanical asymmetries into the string's harmonic motion. This in turn causes the amplitude of higher frequencies to decrease and the frequencies of the harmonic series of each played note to deviate an unacceptable amount from their nominal integer-multiple relationship with the fundamental frequency of the note being played.

This invention is especially useful for beginning players who are not aware of how much the audible tone quality and tunability of the instrument's strings affects the playability and their enjoyment of the instrument. While an experienced guitar player is sensitive to this gradual degradation of the strings' tone quality and tunability, a beginning guitarist is typically not so sensitive, and simply finds the instrument less and less pleasant to play and to tune for unknown reasons. This may contribute to the fact that approximately 90 percent of beginning guitarists quit permanently within one year of starting to learn to play.

While the beginner may only replace a string when it breaks, the experienced player knows that the replacement of all strings immediately yields an excellent and pleasing tone. It is not unusual for professional performing guitarists to change their strings every day or immediately prior to every performance.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A stringed musical instrument string mechanical and tonal degradation measurement apparatus comprising:
    one or more sensors for detecting the vibrational behavior of one or more strings when played, a hardware and/or software signal-processing means to analyze the sensors' string vibration signal to detect and measure in such signal features indicative of mechanical string degradation, a hardware and/or software means to measure the degree of such degradation, and a visual and/or an audible indication to the musician of the degree of such degradation.

2. A stringed musical instrument string mechanical and tonal degradation measurement apparatus according to claim, where said apparatus consists of an external electronic device such as a smart phone running appropriate software to present the functionality of the general apparatus described in claim 1.

3. A stringed musical instrument string mechanical and tonal degradation measurement apparatus according to claim 1, wherein said apparatus consists of an external electronic device such as a guitar tuner modified to also present the functionality of the general apparatus described in claim 1.

4. A stringed musical instrument string mechanical and tonal degradation measurement apparatus according to claim 1, wherein said apparatus consists of an external electronic device such as a guitar amplifier or tone control means incorporates the functionality of the general apparatus described in claim 1.

5. A stringed musical instrument string mechanical and tonal degradation measurement apparatus according to claim 1, wherein;

said apparatus consists of a stand-alone electronic device presenting only the functionality of the general apparatus described in claim 1.

6. A method of employing one or more sensors to detect the vibrational behavior of one or more stringed musical instrument strings, said method comprising;

employing a hardware and/or software signal-processing means to analyze the sensors' string vibration signal to detect and measure signal features associated with string mechanical degradation;

employing a hardware and/or software means to measure the degree of such string degradation; and providing a visual and/or an audible indication to a musician of the degree of such string degradation.

* * * * *